United States Patent Office 2,853,157
Patented Sept. 23, 1958

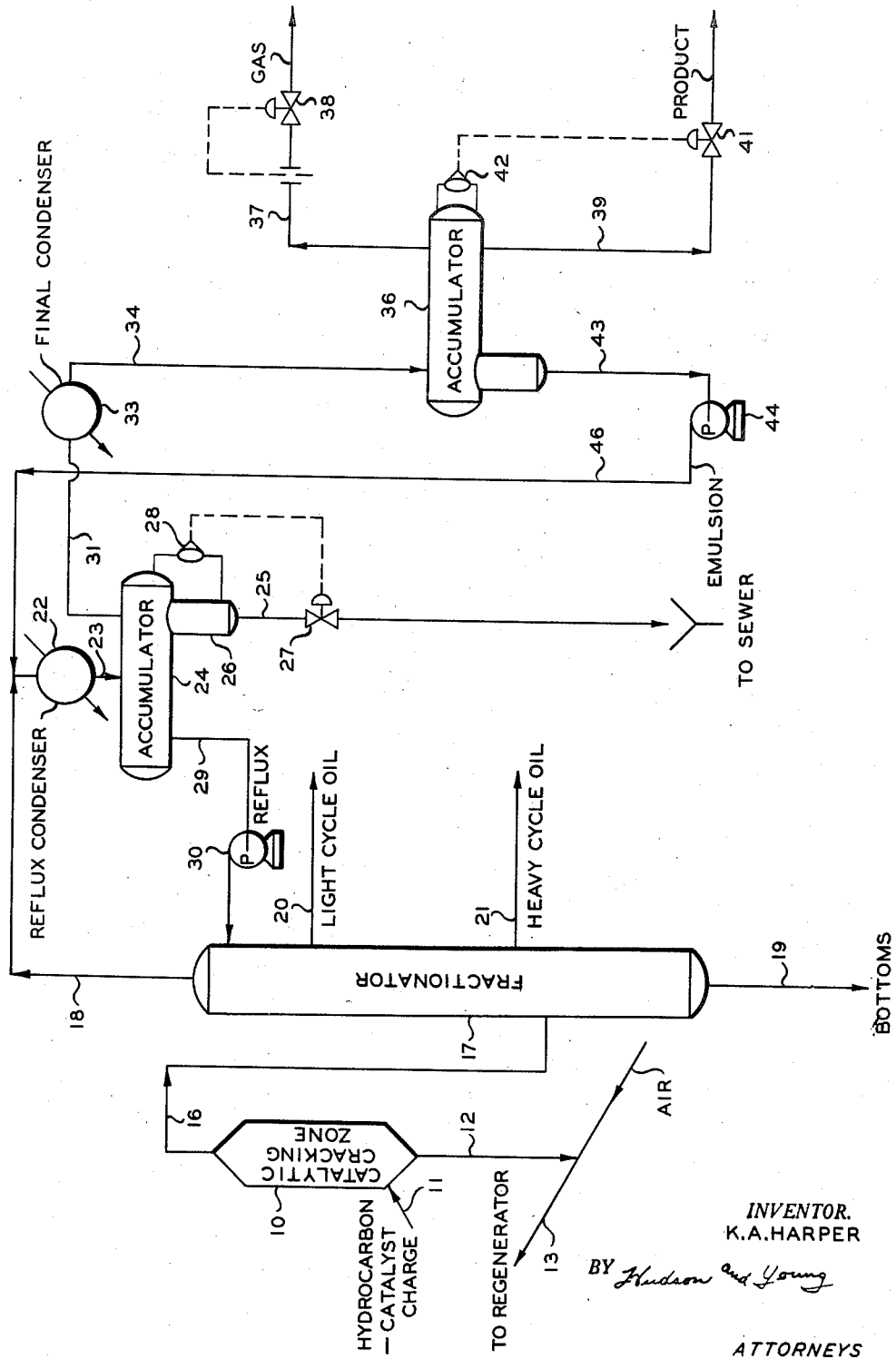

2,853,157
RECOVERY OF HYDROCARBONS

Kenneth A. Harper, Bartlesville, Okla., assignor to Phillips Petroleum Company, a corporation of Delaware Application October 22, 1956, Serial No. 617,636

7 Claims. (Cl. 183—120)

This invention relates to the recovery of hydrocarbons. In another aspect, it relates to a process for removing water from hydrocarbons containing water. In another aspect, it relates to an improved separation process in which hydrocarbons normally discarded are recovered as a portion of the product of the process.

In processes for the separation of hydrocarbons, the products recovered from the separation zone in many instances contain a relatively large amount of water. Treatment of the wet hydrocarbon stream so recovered in order to remove water is often accomplished in two separation stages. For example, the wet vapors from a fractionator are first cooled and then passed into an accumulator wherein a phase separation occurs. The lower water phase in the accumulator is discarded while the now partially dried hydrocarbon is then further cooled and introduced into a second accumulator wherein additional water is separated out. Substantially dried product is recovered from the second accumulator, and in accordance with conventional practice, the separated water is discarded. When treating hydrocarbons, such as gasolines, kerosenes, heating distillates, and the like, at low temperatures, e. g., 50 to 100° F., the water phase separated in the second accumulator has been found to contain valuable hydrocarbons in the form of an oil-water emulsion. As noted above, in conventional processes this water phase is thrown away, resulting in a considerable economic loss because of the hydrocarbons contained in this phase. As described herein, there is provided a process which makes it possible to recover these valuable hydrocarbons which would otherwise be lost.

It is an object of the present invention to provide an improved hydrocarbon separation process.

Another object of the invention is to provide a hydrocarbon separation process in which the yield of product is increased by recovering hydrocarbons normally discarded in conventional processes.

Still another object of the invention is to prevent the loss of hydrocarbons in the water discarded in conventional condenser-accumulator systems.

A further object of the invention is to provide a process for treating hydrocarbons containing water so as to obtain an improved yield of a hydrocarbon product.

A still further object of the invention is to provide an improved condenser-accumulator system for use in the treatment of hydrocarbons containing water.

Other and further objects and advantages of the invention will become apparent to one skilled in the art upon consideration of the accompanying disclosure.

Broadly speaking, the instant invention resides in a process for treating hydrocarbons containing water whereby loss of valuable hydrocarbons is prevented when separating water from the hydrocarbons by two cooling and separation stages. In one embodiment, the process of the invention comprises cooling a hydrocarbon stream containing water, passing the resulting cooled stream into a first separation zone, withdrawing from this separation zone a partially dried hydrocarbon stream, further cooling the partially dried hydrocarbon stream, passing this latter stream into a second separation zone, recovering a substantially dried product from the second separation zone, withdrawing an oil-water emulsion from the second separation zone, and recycling the oil-water emulsion to the hydrocarbon stream containing water prior to the initial cooling of this stream.

In a more specific embodiment of the process of this invention, the hydrocarbon stream to be treated comprises hydrocarbon and water vapors. This stream is cooled initially so as to condense at least a portion of the gaseous hydrocarbons, e. g., to a temperature in the range of 100 to 190° F., after which the cooled stream is passed into a first separation zone at a pressure in the range of 1 to 50 p. s. i. g. In the first separation zone, the water which separates out is discarded while a product stream comprising liquid and gaseous hydrocarbons and water vapor is recovered and passed into a second cooling zone. The product stream is further cooled in the second cooling zone, e. g., to a temperature in the range of 50 to 100° F., and then introduced into a second separation zone at a pressure in the range of 0 to 45 p. s. i. g. In the second separation zone, a water phase separates out and a substantially dried product is withdrawn therefrom. In conventional two-stage systems for separating water from hydrocarbons, the water phase separated in the second separation zone is discarded. However, it has been found that this water phase is commonly in the form of an oil-water emulsion and that a considerable loss of hydrocarbons results when the water phase is merely thrown away. In accordance with this invention, the water phase is recycled to the hot stream containing hydrocarbons and water prior to its introductiion into the first cooling zone. The oil-water emulsion is thereby broken, permitting the separation of hydrocarbons and water to occur in the separation zones and making possible the recovery of the hydrocarbons contained in the emulsion as a portion of the product of the process. It is to be understood that while most of the water is removed from the hydrocarbons by this two-stage cooling and separation process, the hydrocarbons are still saturated (water in solution) at the condensing temperatures.

A more comprehensive understanding of the invention can be obtained by referring to the drawing which is a flow diagram illustrating one embodiment of the instant invention. While the process of the instant invention is described with regard to the treatment of the overhead product stream from a fractionator, it is to be understood that it is not intended to limit the invention to the processing of any one particular hydrocarbon stream. The invention, on the other hand, is broadly applicable to the treatment of any wet hydrocarbon stream, whether in a liquid or gaseous state, from which it is desired to remove the water.

Referring now to the drawing, a crackable hydrocarbon and a suitable cracking catalyst are charged to a catalytic cracking zone 10 through line 11. In the catalytic cracking zone, the hydrocarbon undergoes cracking, the spent catalyst being removed from the zone through line 12. The spent catalyst is thereafter transported in an air stream through line 13 to a regenerator, not shown, wherein the catalyst is regenerated and subsequently reemployed in the cracking process. The effluent from catalytic cracking zone 10 recovered through line 16 is then introduced into fractionator 17. One desired product is recovered from the fractionator by means of overhead line 18 while a product heavier than the overhead product is removed from the bottom of the fractionator through line 19. Intermediate products, such as light cycle oil and heavy cycle oil, are recovered from the fractionator through lines 20 and 21, respectively.

The overhead product stream is in the form of a vapor, containing gaseous hydrocarbons, e. g., gasoline vapor, and considerable water vapor as well. The temperature of the overhead product from fractionator 17 depends upon the particular product which may be desired. For example, when gasolines are recovered overhead, the temperature of the stream is generally in the range 250 to 300° F. The overhead product stream from the fractionator is passed initially into reflux condenser 22 wherein the stream comprising gaseous hydrocarbons and water vapor is cooled, e. g., to a temperature sufficient to condense at least a portion of the gaseous hydrocarbons. The overhead product stream is generally cooled to a temperature in the approximate range of 100 to 190° F., with a temperature between about 120 and 170° F. being usually preferred. From reflux condenser 22, the hydrocarbon stream containing water is flowed via line 23 into reflux accumulator 24 wherein a phase separation of liquid hydrocarbons and water occurs. The lower water phase is removed from the accumulator through line 25 attached to water trap 26 and then passed to a sewer or other suitable disposal means. In order to control the rate at which water is withdrawn from the accumulator, a valve 27 is provided in line 25, the valve being actuated by an interface level controller 28 operatively connected to the accumulator. Through the operation of valve 27 and interface level controller 28, the interface between the water and liquid hydrocarbon contained in the accumulator is maintained at a desired level in the bottom of the accumulator and loss of hydrocarbons through line 27 is avoided. Liquid hydrocarbon, partially depleted of water as a result of the separation in accumulator 24, is withdrawn from the accumulator through line 29 and then returned as reflux to fractionator 17 by means of pump 30.

A stream comprising condensed hydrocarbons, gaseous hydrocarbons, and water vapor is recovered from accumulator 24 through line 31 and then passed into final condenser 33. It is to be understood also that the liquid hydrocarbons contained in this stream will contain a small amount of dissolved and entrained water. Further cooling of the stream occurs in final condenser 33, the cooling, in general, being sufficient to condense all of the gaseous hydrocarbons except the non-condensibles. More specifically, the product stream is generally cooled to a temperature in the approximate range of 50 to 100° F., with a temperature between 60 and 90° F. being usually preferred. After cooling in the final condenser, the hydrocarbon stream is wtihdrawn through line 34 and then introduced into accumulator 36. In accumulator 36 a phase separation occurs with a lower water phase collecting in the bottom of the accumulator. A gaseous product stream is withdrawn from accumulator 36 through line 37 containing a back pressure valve 38 in order to maintain a desired pressure in the system. A substantially dried liquid hydrocarbon product is recovered from accumulator 36 through line 39 containing a valve 41. Valve 41 is operatively connected to liquid level controller 42, thereby providing means for controlling the rate at which the liquid product is withdrawn and preventing the inadvertent contamination of the product with water and/or gases. After recovery from accumulator 36, the substantially dried gaseous and liquid hydrocarbon streams are subjected to further processing by various methods well known to those skilled in this field. For example, the liquid hydrocarbons may be sent to a splitter to make light and heavy catalytic cracked gasolines while the gaseous hydrocarbons may be sent to a fractionator for further separation or to an alkylation process.

The water phase which settles in the bottom of accumulator 36 is withdrawn therefrom through line 43. As discussed hereinbefore, in the normal operation of a condenser-accumulator system employing two-stage cooling and separation, the conventional practice has been to discard this water phase in the same manner as the water phase recovered from the first accumulator. It has been found, however, that the water phase separated in the second accumulator contains valuable hydrocarbons in the form of an oil-water emulsion. In accordance with the present invention, the water phase recovered from the accumulator is recycled by means of pump 44 through line 46 to the overhead product stream recovered from the fractionator, i. e., to line 18. While it is preferred to recycle only the water phase, this stream may contain some of the liquid hydrocarbons separated in accumulator 36. Any hydrocarbons so recycled are ultimately recovered as a portion of the product of the process.

The oil-water emulsion on mixing with the hot vapors carried in line 18 is raised to a temperature sufficient to break the emulsion and release the hydrocarbons. The temperature at which the oil-water emulsion is raised as a result of mixing with the overhead stream from the fractionator depends upon the temperature and volume of the overhead vapors and the recycled oil-water emulsion, but in general the temperature is such as to break out the oil from the emulsion, usually to a temperature above about 100° F. In the case where the emulsion is mixed with vapors, the oil-water emulsion is partially vaporized although in some systems vaporization may not occur. The hydrocarbons and the water so resolved from the emulsion then pass along with the overhead product stream from the fractionator through reflux condenser 22 and into accumulator 24 wherein water is separated out as described hereinbefore. The hydrocarbons from the emulsion are finally recovered in the liquid hydrocarbon phase withdrawn from accumulator 36 as a portion of the product of the process. Since the oil-water emulsion may contain a substantial amount of hydrocarbons, a definite economic saving may be realized by proceeding in accordance with the process of this invention.

As described hereinabove, the process of this invention has been applied to the treatment of a vaporous overhead product stream from a fractionator. Since the instant invention is, in general, applicable to the treatment of any hot hydrocarbon stream containing water, it is to be understood that it is not intended to limit the invention to the particular embodiment illustrated. For example, the invention is applicable to the treatment of a liquid stream, e. g., a kerosene, recovered from the distillation of a raw crude oil. When treating the various types of hydrocarbon streams, it is only necessary that the stream be at a temperature such that the returned oil-water emulsion will be heated sufficiently to break the emulsion. As previously mentioned, these temperatures are dependent upon the volumes and temperatures of the recycle and product streams. However, it is within the purview of the invention to heat the product and/or recycled oil-water emulsion prior to their mixing, if necessary, in order to provide sufficient heat to break the emulsion.

A more complete understanding of the invention may be obtained by referring to the following illustrative example, which is not intended, however, to be unduly limitative of the invention.

EXAMPLE

An arrangement of apparatus similar to that shown diagrammatically in the drawing is employed to process a virgin gas-oil feed stream. The gas-oil, 29.1 API, is charged to the catalytic cracking zone at the rate of 27,800 bbl./day wherein it undergoes a 60.1 percent conversion. The effluent from the catalytic cracker is then introduced into a fractionator from which product streams are removed at the rates set out hereinbelow in the table.

Table

Overhead product, s. c. f./day _____ 32,200,000
Light cycle oil, bbl./day _____ 6,200
Heavy cycle oil, bbl./day _____ 4,300
Bottoms product, bbl./day _____ 550

The overhead product stream comprising gaseous hydrocarbons, which is at a temperature of about 280° F. and a pressure of 6 p. s. i. g., contains about 29 volume percent water. This stream is then passed into the reflux condenser wherein it is cooled to a temperature of about 140° F. and then introduced into the reflux accumulator. Prior to introduction of the overhead product stream into the reflux condenser, the recycled oil-water emulsion, recovered from the second accumulator, as described hereinafter, is mixed with the overhead product stream. The reflux accumulator is operated at a temperature of about 140° F. and a pressure of about 5 p. s. i. g. The water which separates out in the reflux accumulator and contains only a trace of oil is withdrawn therefrom and discarded. A partially dried hydrocarbon stream is recovered from the reflux accumulator and then passed through a final condenser wherein it is cooled to a temperature at about 80° F. prior to introduction into the second accumulator. In the second accumulator, which is operated at a temperature of about 80° F. and a pressure of about 3 p. s. i. g., a water phase is separated out in the form of an oil-water emulsion. This emulsion is withdrawn from the accumulator at the rate of 550 bbl./day and recycled to the overhead product stream. The emulsion contains about 9.1 volume percent hydrocarbons which are subsequently recovered as a portion of the liquid product of the process. Liquid hydrocarbons, containing about 0.017 volume percent dissolved water, are withdrawn from the second accumulator at the rate of 9,050 bbl./day. Gaseous hydrocarbons, containing about 2.7 volume percent water, are removed from the second accumulator at the rate of 18,495,000 s. c. f./day.

From the foregoing, it is seen that the oil contained in the water phase withdrawn from the second accumulator is recovered as a portion of the product of the process. Thus, in accordance with the process as described 9,050 bbl./day of liquid hydrocarbons are recovered, whereas in conventional processes, the yield of liquid hydrocarbon product is only 9,000 bbl./day. Thus, valuable hydrocarbons which are lost in conventional processes are recovered when proceeding in accordance with the instant invention.

From a consideration of the foregoing disclosure, various modifications and variations will become apparent to one skilled in the art. Such modifications and variations are believed to come within the spirit and scope of the instant invention.

I claim:

1. In a separation process which comprises cooling a hydrocarbon stream containing water, passing said cooled stream into a first separation zone wherein water is separated from said hydrocarbon, recovering a partially dried hydrocarbon stream from said first separation zone, further cooling said partially dried hydrocarbon stream, passing the further cooled hydrocarbon stream into a second separation zone, recovering hydrocarbon product from said second separation zone, and withdrawing an oil-water emulsion from said second separation zone, the improvement which comprises recycling said oil-water emulsion to the first-mentioned hydrocarbon stream prior to the first-mentioned cooling of said stream.

2. A separation process which comprises cooling a hydrocarbon stream containing water; passing said cooled stream into a first separation zone; removing water from said first separation zone; withdrawing partially dried hydrocarbons from said first separation zone; cooling said partially dried hydrocarbons; passing said cooled, partially dried hydrocarbons into a second separation zone; recovering substantially dry hydrocarbon product from said second separation zone; withdrawing oil-water emulsion from said second separation zone; and recycling said oil-water emulsion to the first-mentioned hydrocarbon stream prior to the first-mentioned cooling of said stream.

3. The process of claim 2 wherein said hydrocarbon stream containing water is cooled to a temperature between about 100 and 190° F. and said partially dried hydrocarbons are cooled to a temperature between about 50 and 100° F.

4. A process for treating a hot, wet hydrocarbon stream recovered from a separation zone which comprises passing said hot hydrocarbon stream containing water into a first cooling zone; cooling said hot hydrocarbon stream in said first cooling zone to a temperature sufficient to decrease the solubility of said water in said hydrocarbon stream, said temperature being substantially above about 100° F.; passing said cooled hydrocarbon stream into a first separation zone; removing water from said first separation zone; withdrawing partially dried hydrocarbons from said first separation zone; passing said partially dried hydrocarbons into a second cooling zone; cooling said partially dried hydrocarbons in said second cooling zone to a temperature below about 100° F.; passing said cooled, partially dried hydrocarbons into a second separation zone; recovering substantially dry hydrocarbon product from said second separation zone; withdrawing oil-water emulsion from said second separation zone; and recycling said emulsion to said hot hydrocarbon stream prior to its being passed into said first cooling zone.

5. The process of claim 4 wherein said hot hydrocarbon stream containing water is cooled to a temperature between about 100 and 190° F. in said first cooling zone and said partially dried hydrocarbons are cooled to a temperature between about 50 and 100° F. in said second cooling zone.

6. A process for treating a hydrocarbon stream comprising gaseous hydrocarbons and water vapor, said stream being at a temperature in the approximate range of 250 to 300° F., which comprises passing said hydrocarbon stream into a first cooling zone; cooling said hydrocarbon stream in said first cooling zone to a temperature sufficient to condense at least a portion of said gaseous hydrocarbons, said temperature being substantially above about 100° F.; passing said cooled hydrocarbon stream into a first separation zone; removing water from said first separation zone; withdrawing partially dried hydrocarbons from said first separation zone; passing said partially dried hydrocarbons into a second cooling zone; cooling said partially dried hydrocarbons in said second cooling zone to a temperature below about 100° F.; passing said cooled, partially dried hydrocarbons into a second separation zone; recovering substantially dry hydrocarbon product from said second separation zone; withdrawing oil-water emulsion from said second separation zone; and recycling said oil-water emulsion to said hydrocarbon stream comprising gaseous hydrocarbons and water vapor prior to passing said hydrocarbon stream into said first cooling zone.

7. The process of claim 6 wherein said hydrocarbon stream is cooled in said first cooling zone to a temperature between about 120 and 170° F. and said partially dried hydrocarbons are cooled in said second cooling zone to a temperature between about 60 and 90° F.

References Cited in the file of this patent

UNITED STATES PATENTS

| | | |
|---|---|---|
| 2,747,002 | Walker et al. | May 22, 1956 |
| 2,758,665 | Francis | Aug. 14, 1956 |

UNITED STATES PATENT OFFICE
CERTIFICATE OF CORRECTION

Patent No. 2,853,157                                                       September 23, 1958

Kenneth A. Harper

It is hereby certified that error appears in the printed specification of the above numbered patent requiring correction and that the said Letters Patent should read as corrected below.

Column 2, line 32, for "introductiion" read -- introduction --; column 3, line 48, for "wtihdrawn" read -- withdrawn --; column 4, line 72, for "32,200,000" read -- 38,200,000.

Signed and sealed this 13th day of January 1959.

(SEAL)

Attest:

KARL H. AXLINE                                                         ROBERT C. WATSON

Attesting Officer                                             Commissioner of Patents